Feb. 7, 1967 V. J. DI SABATO 3,302,889
BLOW-IN DOOR EJECTOR FOR STOL
Filed Oct. 1, 1964 6 Sheets-Sheet 1
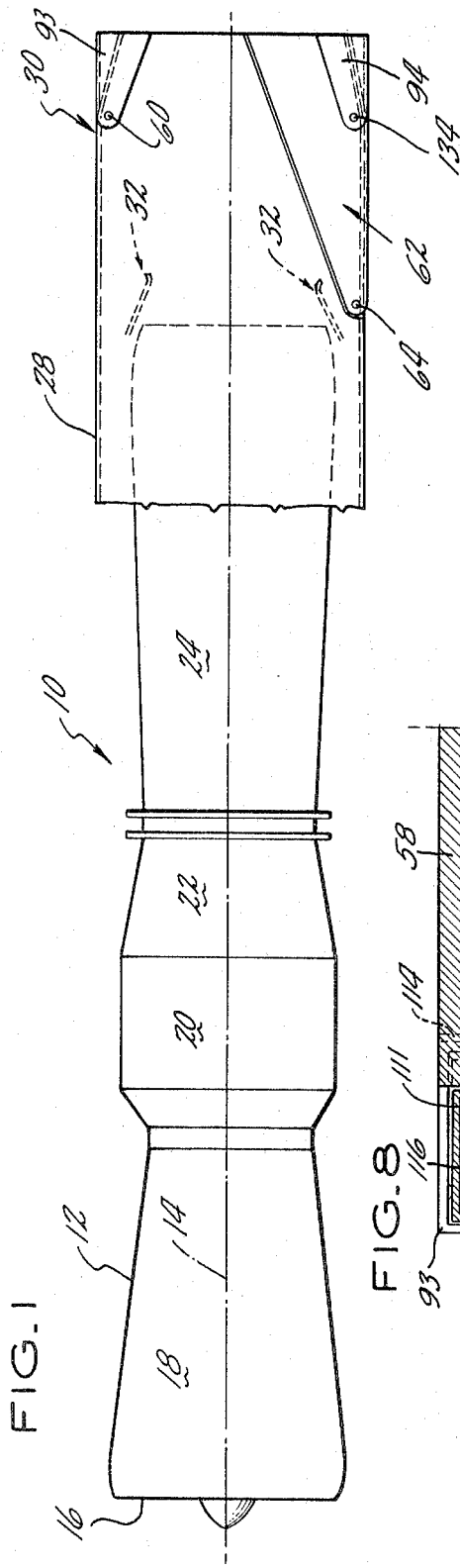
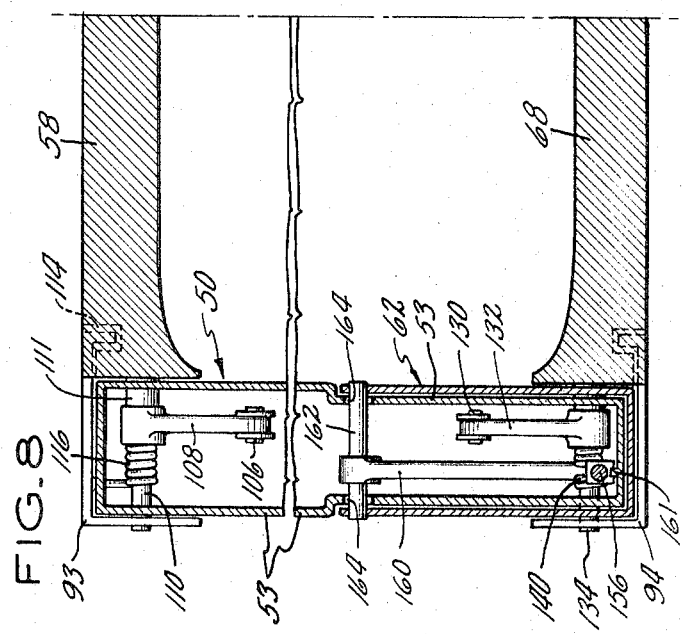
INVENTOR
VINCENT J. DISABATO
BY Vernon F. Hauschild
ATTORNEY

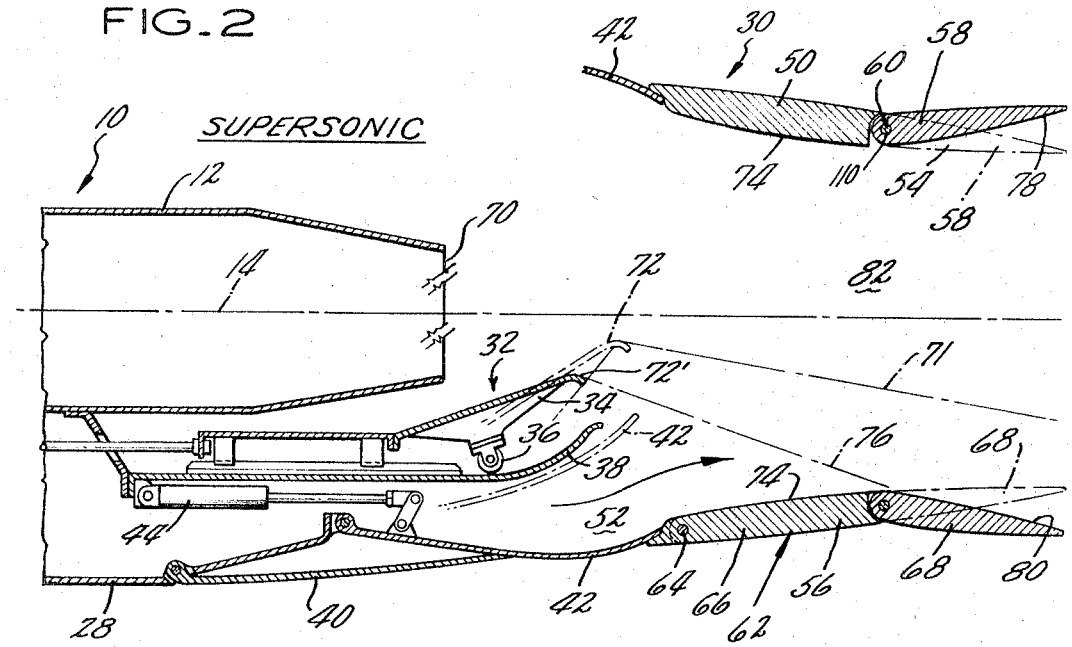
FIG. 2 SUPERSONIC
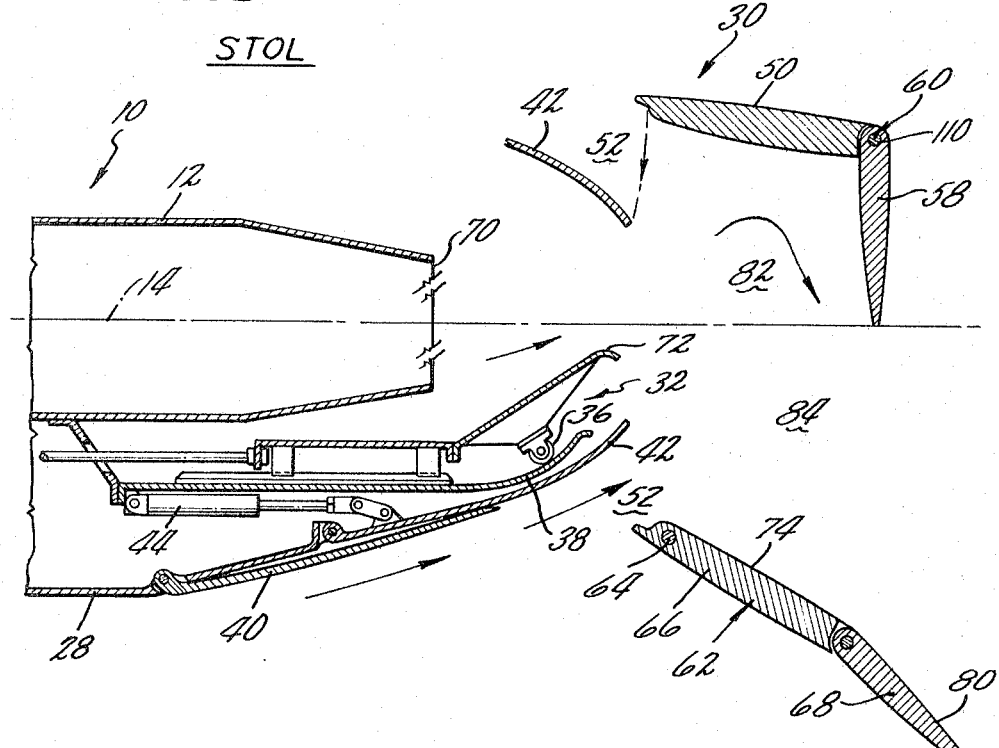
FIG. 3 STOL
INVENTOR
VINCENT J. DiSABATO
BY Vernon F. Hauschild
ATTORNEY

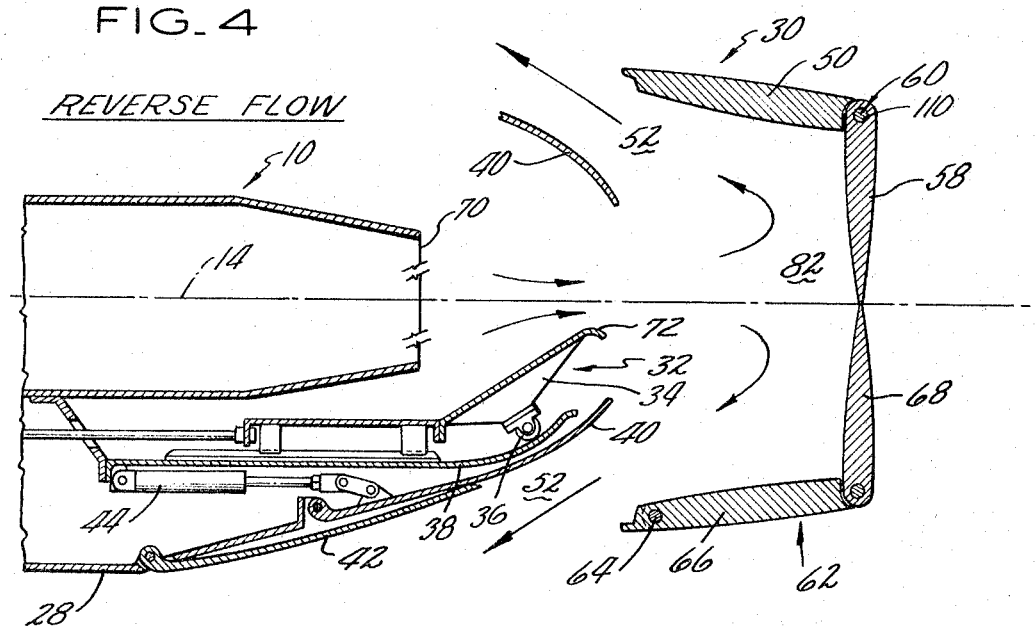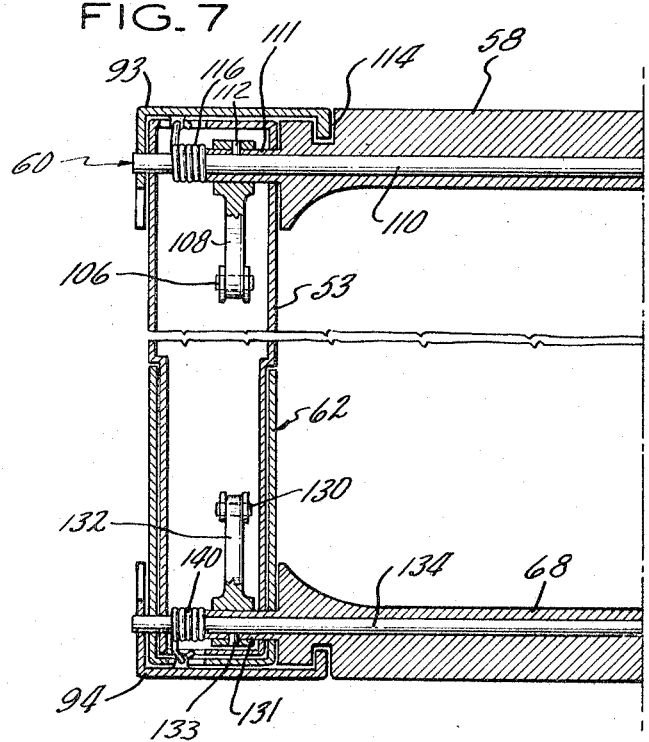

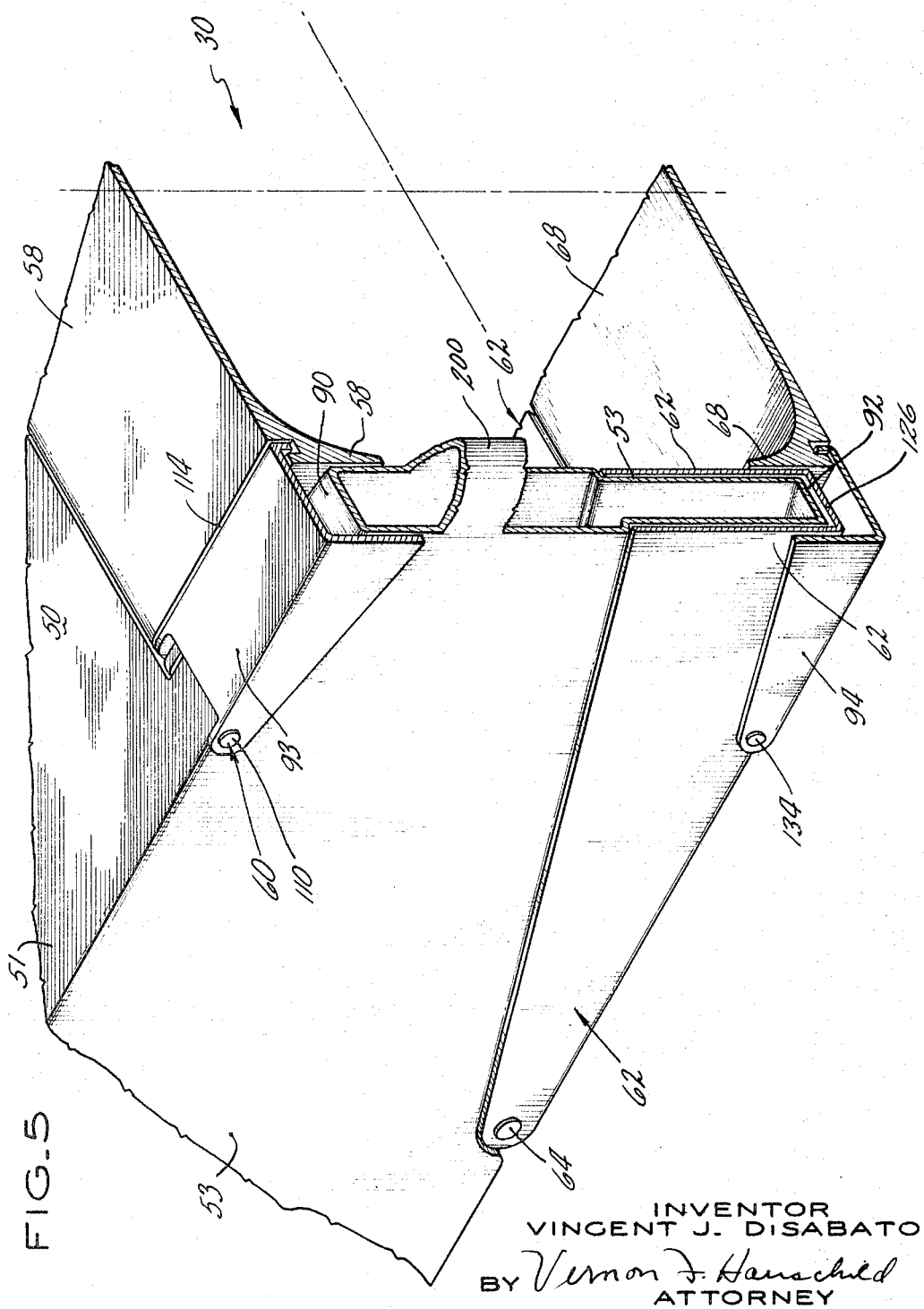

Feb. 7, 1967 V. J. DI SABATO 3,302,889
BLOW-IN DOOR EJECTOR FOR STOL

Filed Oct. 1, 1964 6 Sheets-Sheet 6

INVENTOR
VINCENT J. DiSABATO
BY Vernon F. Hauschied
ATTORNEY

United States Patent Office 3,302,889
Patented Feb. 7, 1967

3,302,889
BLOW-IN DOOR EJECTOR FOR STOL
Vincent J. Di Sabato, Southington, Conn., assignor to United Aircraft Corporation, East Hartford, Conn., a corporation of Delaware
Filed Oct. 1, 1964, Ser. No. 400,803
7 Claims. (Cl. 239—265.29)

This invention relates to exhaust nozzles for use with thrust creating vehicles which operate at both subsonic and supersonic speed and more particularly to ejector type exhaust nozzles which have provision for thrust reversal, short take-off and lift (STOL), subsonic and supersonic operation.

It is an object of this invention to teach an ejector type exhaust nozzle which is convergent for subsonic operation, which is convergent-divergent for supersonic operation, which is capable of discharging the exhaust gas rearwardly through the ejector opening for thrust reversal operation and which is capable of directing the exhaust gases downwardly for STOL operation.

It is a further object of this invention to teach an ejector type exhaust nozzle which includes a variable area, circular primary nozzle as part of a convergent, convergent-divergent exhaust nozzle for subsonic and supersonic speeds, respectively. This exhaust nozzle includes a fixed member or shroud section of rectangular cross section and which has a pivotable flap at the top, after end thereof and a double pivotable flap at the bottom thereof.

Other objects and advantages will be apparent from the specification and claims and from the accompanying drawings which illustrate an embodiment of the invention.

FIG. 1 is a side view of a supersonic vehicle or power plant for a supersonic vehicle illustrating my exhaust nozzle.

FIG. 2 is a cross-sectional showing of my exhaust nozzle to show the exhaust nozzle in its supersonic operating condition in solid lines and in its subsonic operating condition in phantom lines.

FIG. 3 is a cross section of my exhaust nozzle in its STOL position.

FIG. 4 is a cross section of my exhaust nozzle in its thrust reversal position.

FIG. 5 is a perspective and partial rear view of my exhaust nozzle illustrating the nozzle flaps.

FIG. 7 is a showing taken along line 7—7 of FIG. 6.

FIG. 8 is a showing taken along line 8—8 of FIG. 6.

Figure 10:
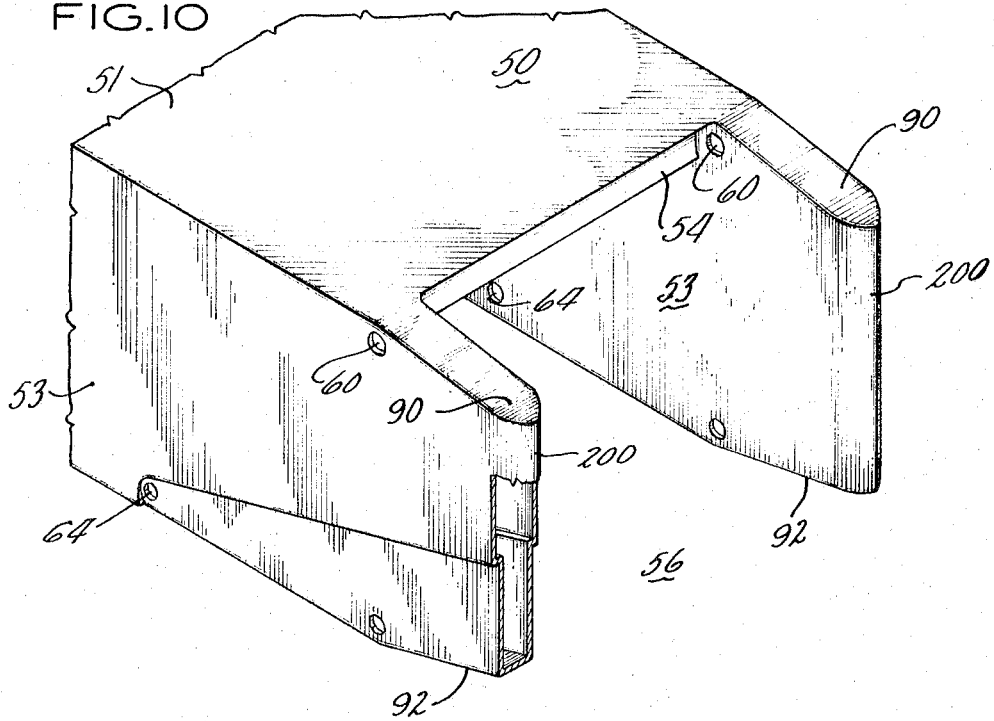

FIG. 10 corresponds to FIG. 5 but with the flaps removed to better illustrate the construction of my exhaust nozzle shroud.

Referring to FIG. 1 we see my exhaust nozzle in an appropriate environment, namely, a turbojet engine for a supersonic flight vehicle, but it should be borne in mind that my exhaust nozzle could be used in other environments as well.

FIG. 1 shows engine 10 enveloped within casing 12, which is preferably of circular cross section and concentric about axis 14. Engine 10 includes air inlet section 16, compressor section 18, burner section 20, turbine section 22 and may include afterburner section 24 and also includes my exhaust nozzle 30 which is attached to nacelle or forebody 28. In the operation of engine 10, air enters case 12 through air inlet 16 and is compressed in passing through compressor 18, has energy added thereto in passing through burner section 20 and has sufficient energy extracted therefrom in passing through turbine section 22 to drive compressor section 18. After leaving turbine section 22, the gases are reheated due to the reburning process which takes place in afterburner 24 and are then discharged through my exhaust nozzle 30 to atmosphere to perform a thrust creating function. Except for my exhaust nozzle 30, engine 10 is of conventional design and may be of the type more fully illustrated in U.S. Patent Nos. 2,711,631 and 2,747,367. Afterburner 24 is more fully illustrated in U.S. Patent Nos. 2,846,841 and 2,846,842.

Figure 9:
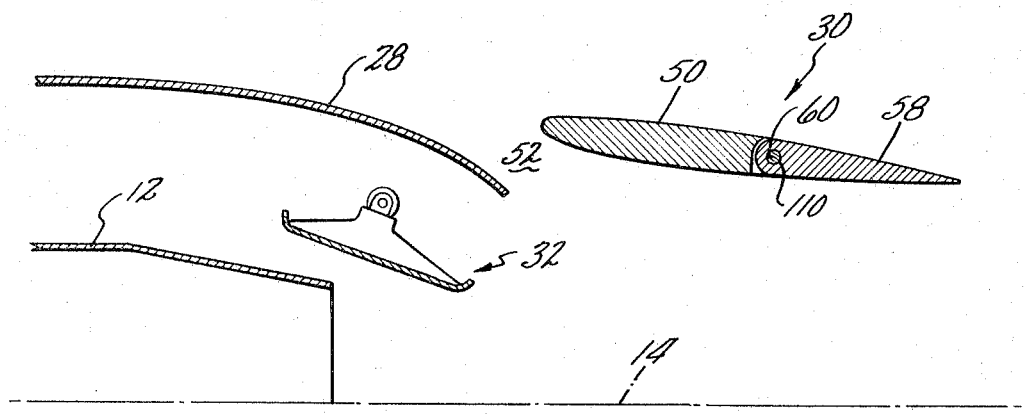
FIG. 9 is a cross-sectional representation of my exhaust nozzle without blow-in doors.

My exhaust nozzle 30 is shown in greater particularity in FIGS. 2–10. Referring to FIG. 2 we see my exhaust nozzle 30 in its subsonic operating position in phantom lines and in its supersonic operating position in solid lines. Exhaust nozzle 30 includes variable area primary exhaust nozzle 32, which comprises a plurality of circumferentially positioned and intersealed flaps 34, which may be actuated between its minimum area, subsonic position shown in phantom and its maximum area, supersonic position shown in solid lines by any convenient actuating mechanism such as hydraulic or pneumatic cylinder-piston arrangement (not shown) which will cause roller 36 to roll along cam surface 38. Primary exhaust nozzle 32 may be of the type more particularly described in U.S. Patent No. 2,974,480. Forebody 28 envelops the primary exhaust nozzle 32 and may or may not include blow-in doors 40 and 42. It should be noted that forebody 28 may extend rearwardly as shown in FIG. 9 so that blow-in doors are not an essential part of my exhaust nozzle. As used herein, the word forebody means duct 28 with or without blow-in doors 40 and 42. Blow-in doors 40 and 42 may be either actuated aerodynamically or by any conventional system such as hydraulic or pneumatic piston 44 between their solid line closed, supersonic position of FIG. 2 of their phantom line, open, subsonic position illustrated in FIG. 2. Blow-in doors 40 and 42 are positioned at both the top and the bottom of forebody 28.

Exhaust nozzle 30 also includes fixed shroud or fixed member 50, which is positioned downstream of forebody 28 and primary exhaust nozzle 32 and which is of rectangular cross section. Shroud 50 cooperates with forebody 28 to form ejector or thrust reverser passage 52 therebetween. In the FIG. 9 construction, passage 52 is defined directly between forebody member 28 and shroud 50, while in the FIG. 2 position it is formed between shroud 50 and the blow-in doors 40 and 42 which form part of forebody 28 when in their phantom line, subsonic position. As best shown in FIG. 10, rectanglar shroud 50 includes top wall 51 and two side walls such as 53. Top wall 51 has detent or recesses 54 in the after end thereof and slot 56 extends the full axial dimension along the bottom of shroud 50 between the side walls, such as 53. Again referring to FIG. 2, we see that top flap 58 is positioned in detent 54 and is pivotally attached to shroud 50 at pivot point 60 such that it may be aerodynamically or physically actuated between its FIG. 2 solid line, supersonic position and its FIG. 2 phantom line, subsonic position. Bottom flap 62 is positioned in elongated slot 56 between side walls such as 53 (FIG. 10) of shroud 50 and is pivotally attached at its forward end at pivot point 64 to shroud 50. Bottom flap 62 includes forward flap portion 66 and after flap portion 68. Bottom flap after portion 68 may be aerodynamically or physically actuated between its FIG. 2 solid line, supersonic position and its FIG. 2 phantom line, subsonic position.

As previously mentioned in FIG. 2, my exhaust nozzle 30 is shown in its supersonic and subsonic operating positions. More particularly, when primary exhaust nozzle 32, top flap 58 and bottom flap rear portion 68 are in their phantom line position, and when forebody 28 (FIG. 9) or blow-in doors 42 (FIG. 2) cause ejector passage 52 to be open, my exhaust nozzle 30 is forming a convergent exhaust nozzle. The exhaust gases which are discharged from engine 10 through exhaust outlet 70 pass through convergent primary exhaust nozzle 32 and commence to expand substantially along line 71 downstream of throat 72 thereof. At the same time, atmospheric air enters through ejector passage 52 and passes along the inner surface 74 of shroud 50 and flaps 58 and 62, preferably filling the drag creating void which would otherwise be left between exhaust gas expansion line 71 and surface 74.

When my exhaust nozzle is operating in its supersonic position, primary exhaust nozzle 32 is in its maximum area, solid line FIG. 2 position, blow-in doors 40 and 42 may either be closed aerodynamically or by cylinder 44 and top flap 58 and bottom flap portion 68 are aerodynamically or physically pivoted to their outer or solid line FIG. 2 positions to form a divergent continuation of shroud 50. During supersonic operation, my exhaust nozzle 30 is convergent-divergent. During supersonic operation the engine exhaust gases are again discharged through outlet 70 and through throat 72' and expand substantially along line 76 to engage the inner surfaces 78 of top flap 58 and 80 of bottom flap inner portion 68.

My exhaust nozzle is shown in its short take-off and lift (STOL) position in FIG. 3. In this position, when blow-in doors 40 and 42 are used, they are in their open position, primary exhaust nozzle 32 is in its minimum area position, top flap 58 is actuated by mechanism to be described hereinafter so that it pivots into the interior 82 of shroud 50 and bottom flap 62 is pivoted in a fashion to be described hereinafter laterally outwardly and downwardly from shroud 50 while bottom flap rear portion 68 is pivoted to its FIG. 3 STOL position.

During STOL operation, the engine exhaust gases which are discharged through outlet 70 and throat 72 of primary exhaust nozzle 32 are deflected by top flap 58 downwardly as shown by arrows and through the downwardly and laterally outwardly projecting passage 84 formed by shroud 50 and flaps 58 and 62 when in their FIG. 3 STOL positions. This downward and laterally outward exhaust gas flow is aided by the Coanda effect due to the atmospheric air which is passing into cavity 82 and passage 84 through the top ejector passage 52. The atmospheric air which enters through the bottom ejector passage 52 passes along the inner surface 74 of bottom flap 62 for flap cooling purposes.

My exhaust nozzle 30 is shown in its reverse flow or thrust reverser position in FIG. 4. Primary exhaust nozzle 32 is in its minimum area position and bottom flap forward portion 66 is in its stowed positioned forming a part of shroud 50 while top flap 58 and bottom flap rear portion 68 are pivoted by mechanism to be described hereinafter into the interior 82 of shroud 50. When my exhaust nozzle 30 is in its thrust reverser position just described, the exhaust gases from engine 10 pass through outlet 70 and primary exhaust nozzle throat 72 into the interior 82 of shroud 50. The positions of flaps 58 and 68 prevent the passage of the exhaust gases in the normal fashion and, therefore, they are reversed in flow as shown by arrows in FIG. 4 outwardly and rearwardly through ejector or thrust reverser passage 52. It will accordingly be seen that my exhaust nozzle 30 is capable of subsonic and supersonic normal operation as shown in FIG. 2, STOL operation as shown in FIG. 3 and thrust reverser operation as shown in FIG. 4.

Figure 6:
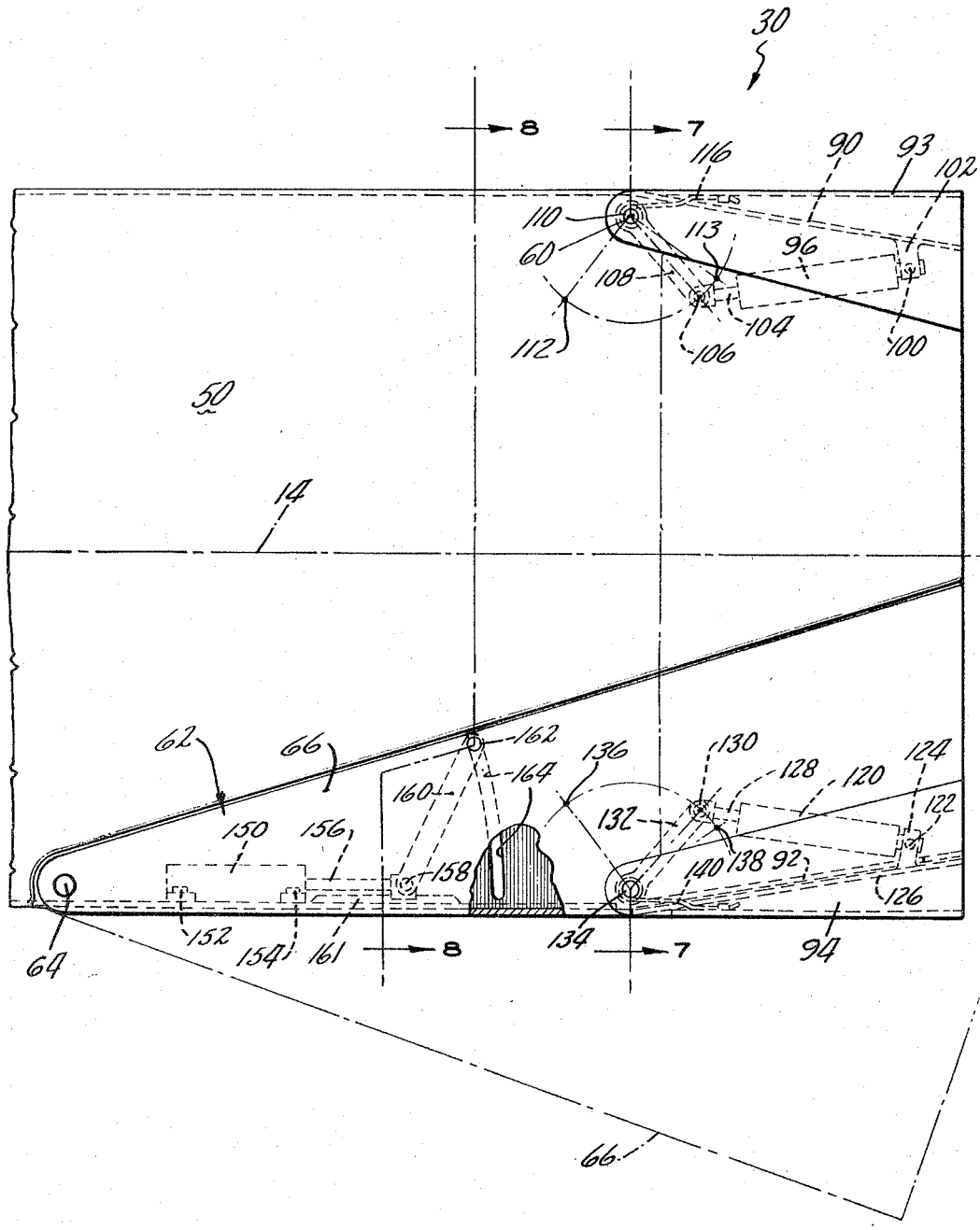
FIG. 6 is a side view of my exhaust nozzle illustrating the flap actuating mechanisms.

Referring to FIG. 6, we see the actuating mechanism for my flaps 58, 62 and 68. Shroud 50 is shown to have convergent wall 90 at the top thereof and convergent wall 92 at the bottom thereof. As best shown in FIG. 5, top corner flap 93 and bottom corner flap 94 are positioned at the rear corners of shroud 50 and similar flaps are positioned in the corresponding corners of shroud 50 but are not shown in any of the drawings due to space limitations, but are precisely like flaps 93 and 94. With respect to the actuation of top flap 58, it will be noted by viewing FIG. 6 that hydraulic actuating cylinder 96 is pivotally attached at 100 to bracket 102 which is secured solidly to convergent wall 90 of shroud 50. Rod 104 projects from and is actuated by cylinder-piston arrangement 96 and is pivotally attached at 106 to crank-arm 108, which rotates in conventional fashion on shaft 110. As best shown in FIGS. 7 and 8, shaft 110 extends through sleeve 111 which is part of flap 58 and is attached by pin 112 or otherwise to crank 108. Accordingly, as cylinder-piston arrangement 96 causes shaft 104 to extend and retract, crank 108 and sleeve 111 cause top flap 58 to pivot between its subsonic position, shown in phantom lines in FIG. 2, when pivot point 106 is as shown in FIG. 6 and its thrust reverser position when pivot point 106 moves to point 112 in FIG. 6. Top flap 58 may be actuated to its FIG. 2, supersonic position by the movement of pivot point 106 to point 114 in FIG. 6. As best shown in FIGS. 7 and 8, corner flap 93 extends into recess 114 in top flap 58 and will therefore be carried outwardly therewith when top flap 58 goes to its supersonic, FIG. 2 position. Spring 116 is attached to shaft 110 and to top corner flap 93 and is loaded so as to bias top corner flap 93 and hence top flap 58 so that top corner flap 93 bears against convergent wall 90 of shroud 50 thereby placing top flap 58 in its subsonic, FIG. 2 position.

As best shown in FIG. 6, the actuation of bottom flap rear portion 68 and bottom corner flap 94 is very similar to the actuation of top flap 58 and top corner flap 93. Hydraulic cylinder-piston arrangement 120 is pivotally attached at pivot point 122 to bracket 124, which is intricately attached to convergent wall 126 at the after end of bottom flap 62. Rod 128 is actuated by cylinder 120 and is pivotally connected at point 130 to crank-arm 132. Crank-arm, in turn, rotates in conventional fashion on shaft 134 and sleeve 131 of flap 68 is pinned by pin 133 to crank 132. As best shown in FIGS. 7 and 8, shaft 134 extends through bottom flap rear portion 68. As pivot point 130 is caused to move in the fashion just described to point 136, bottom flap rear portion 68 is pivoted to its thrust reverser, FIG. 4 position and when pivot point 130 is moved by cylinder 120 to point 138, bottom flap rear portion 68 is moved either to its supersonic, FIG. 2 position or its STOL, FIG. 3 position depending upon the position of bottom flap 62. As best shown in FIGS. 6 and 7, spring 140 engages shaft 134 and bottom corner flap 94 and biases flap 94 and hence bottom flap rear portion 68 so that corner flap 94 bears against convergent surface 92 of shroud 50 and such that bottom flap rear portion 68 assumes its FIG. 2, subsonic position when bottom flap 62 is in its FIG. 2 position As shown in FIG. 6, hydraulic cylinder-piston arrangement 150 is integrally attached to shroud 50 by conventional means such as nut and bolt arrangements 152 and 154. Shaft 156 is actuated by cylinder assembly 150 and is pivotally attached at pivot point 158 to crankarm 160 which is attached to a cross-pin 162. Shaft 156 is guided on track 161. Cross-pin 162, as best shown in FIG. 8, is attached to bottom flap 62 and passes through arcuate slot 164 in side wall 53 of shroud 50. The aerodynamic loading on bottom flap 62, due to the force of exhaust gas acting thereagainst, will cause flap 62 to move to its FIG. 3 STOL position, which position is also shown in phantom in FIG. 6. This movement of bottom flap 62 is permitted when actuating cylinder 150 is de-energized. When actuating cylinder 150 is energized actuating rod 160 is caused thereby to move vertically within slot 164 to the position shown in FIG. 6 to close bottom flap 62 and thereby bring it to its FIG. 2 and FIG. 4 positions.

FIG. 5 shows a perspective showing of my exhaust nozzle 30 to show the inter-relationship between the shroud 50 and the flaps 58, 62, 68, 93 and 94. It will be noted by viewing FIG. 5 that the side walls such as 53 and shroud 50 terminate in aerodynamically-shaped after sections 200.

It will be obvious to those skilled in the art that convergent wall 92 of shroud 50 must be broken away in part to permit the movement of cylinder 120 and its associated mechanism therethrough.

It is to be understood that the invention is not limited to the specific embodiment herein illustrated and described but may be used in other ways without departure from its spirit as defined by the following claims.

I claim:

1. In an ejector type exhaust nozzle, a primary nozzle, a forebody having an after end and enveloping said primary nozzle, a fixed shroud located downstream of said nozzle and forebody and having a forward and an after end, said forebody after end and said shroud forward end shaped and positioned to define an ejector and thrust reverse passage therebetween, a bottom flap pivotally attached at its forward end to said shroud and being pivotable between a first position wherein it forms part of said shroud and a second position wherein it projects downwardly from said shroud, said bottom flap having a rear flap portion pivotable with respect thereto between a first position wherein it forms part of said bottom flap and a second position wherein it projects into the interior of said shroud, a top flap pivotally attached to said shroud and pivotable between a first position wherein it forms part of said shroud and a second position wherein it projects into said shroud, means to pivot said top flap and said rear flap portion of said bottom flap into said second positions to block the interior of said shroud, and means to pivot said top and said bottom flaps into said second positions to form a downwardly projecting passage.

2. In an ejector type exhaust nozzle having an axis for a subsonic vehicle, a primary exhaust nozzle concentric about said axis and defining a first gas passage, a forebody enveloping said primary nozzle and cooperating therewith to define a second gas passage and having an after end, an ejector shroud symmetric about said axis and positioned rearwardly of said primary nozzle and forebody and having a forward end, said after end of said forebody and said forward end of said shroud shaped and positioned to define a third gas passage therebetween, said shroud having a first detent at the after end of the top thereof and having a second detent extending for the full shroud dimension along the bottom thereof, a bottom flap positioned in said second detent and pivotally attached at its forward end to said shroud and being actuatable between a first position wherein it forms a part of said shroud and a second position wherein it projects downwardly from said shroud, said bottom flap having an after portion pivotally connected thereto and actuatable between a first position wherein it forms a part of said bottom flap and a second position wherein it projects into said shroud interior when said bottom flap is in said first position, a top flap positioned in said first detent and pivotally attached to said shroud and actuatable between a first position wherein it forms a part of said shroud and a second position wherein it extends into the interior of said shroud, means to actuate said top flap and said bottom flap to said second positions to form a downward projecting passage therebetween, and means to actuate said top flap and said bottom flap rear portion to said second positions while said bottom flap is in said first position to block the interior of said shroud.

3. Apparatus according to claim 2 wherein said primary nozzle is of circular cross section and variable area and wherein said shroud is of rectangular cross section and wherein said bottom flap forms the bottom of said rectangle and said top flap forms a portion of said top of said rectangle.

4. Apparatus according to claim 3 wherein said flaps and said shroud are shaped to present a divergent expansion surface when said flaps are in said first positions, and means to pass exhaust gas through said primary nozzle for expansion into said shroud and against said expansion surface for thrust generation purposes and so that said exhaust gas is directed downwardly when said flaps are in said second positions, and further so that said exhaust gas is discharged through said third passage when said top flap and said bottom flap afterportions are in said second positions.

5. An ejector type exhaust nozzle including a variable area primary exhaust nozzle of circular cross-section, a forebody of circular cross-section enveloping said primary exhaust nozzle and having an after end positioned rearwardly of said primary exhaust nozzle, a shroud of rectangular cross-section and having a top, bottom and two sides and positioned rearwardly of said forebody and having a forward edge in substantial lateral alignment with said forebody after end, said forebody after end and said shroud forward end being positioned and shaped to form an ejector inlet and thrust reverser passage therebetween, said shroud having a detent at the rear of the top wall thereof and having a slot running the full length of the bottom wall, a top flap having a forward and an after end positioned in said detent and being pivotally attached to said shroud at said top flap forward end so that said top flap is pivotable between a first position wherein said top flap fills said detent and forms part of said shroud and a second position wherein said top flap extends into the interior of said shroud, a two piece bottom flap having a forward and an after end and a forward and after portion and being positioned in and extending the full length of said slot and being pivotally attached to said shroud at said bottom flap forward end and being pivotable between a first position wherein said bottom flap forms part of said shroud and a second position wherein said bottom flap projects laterally outwardly from said shroud, said bottom flap after portion pivotally connected to said bottom flap forward portion, said after portion being pivotable between a first position wherein said after portion forms part of said shroud when said bottom flap is in said first position and a second position wherein said after portion projects into the interior of said shroud when said bottom flap is in said first position, means to pivot said top flap and said bottom flap after portion to said second positions to block off the interior of said shroud, and means to pivot said top flap and said bottom flap to said second positions to form a laterally directed passage.

6. Apparatus according to claim 3 wherein said bottom flap is of U-shaped cross-section and having two side walls and a base, said bottom flap side walls tapering to be of minimum height at said forward end and of maximum height at said after end, said bottom flap side walls being of U-shaped cross-section and enveloping a portion of said shroud sides when said bottom flap is in said first position, and corner flaps pivotally attached to the corners of said shroud and said bottom flap adjacent said top flap and said bottom flap after portion, said corner flaps being spring loaded to bear against said shroud and being connected to said top flap and said bottom flap after portion to be pivoted laterally outwardly of said shroud therewith due to aerodynamic loading of said top flap and said bottom flap after position.

7. In an ejector type exhaust nozzle, a primary nozzle, a forebody having an after end and enveloping said primary nozzle, a fixed shroud located downstream of said nozzle and forebody and having a forward and an after end, said forebody after end and said shroud forward end shaped and positioned to define an ejector and thrust reverse passage therebetween, blow-in doors pivotally attached to said forebody and moveable between a first position to block off said passage and a second position to open said passage, a bottom flap pivotally attached at its forward end to said shroud and being pivotable between a first position wherein it forms part of said shroud and a second position wherein it projects downwardly from said shroud, said bottom flap having a rear flap portion pivotable with respect thereto between a first position wherein it forms part of said bottom flap and a second position wherein it projects into the interior of said shroud, a top flap pivotally attached to said shroud and pivotable between a first position wherein it forms part of said shroud and a second position wherein it projects into said shroud, means to pivot said top flap and said rear flap portion of said bottom flap into said second position to block the interior of said shroud, and means to pivot said top and said bottom flaps into said second positions to form a downwardly projecting passage.

No references cited

CARLTON R. CROYLE, *Primary Examiner.*